Patented July 13, 1954

2,683,748

UNITED STATES PATENT OFFICE 2,683,748

ACID CATALYSIS OF PHENOL ETHERIFICATIONS WITH TRIALKYLPHOSPHATES

Alan Bell, Kingsport, Tenn., assignor to Eastman Kodak Company, Rochester, N. Y., a corporation of New Jersey No Drawing. Application July 31, 1952, Serial No. 301,966

8 Claims. (Cl. 260—612)

The present invention relates to a process for the preparation of alkyl ethers of phenols by alkylation of phenols with trialkyl phosphates. More particularly, the invention is concerned with acid catalysis of these alkylation reactions.

The alkylation of phenols with trialkylphosphates has been reported by Noller and Dutton (JACS 55, 424, 1933). The report indicates that phosphates such as the ethyl, n-butyl, sec.-butyl and n-amyl phosphates are found to be useful in the alkylation of phenol in the absence of a catalyst. Yields obtained were of the order of 21.6% when phenetole was prepared. Alkylations which have been performed with alkylating agents such as dialkysulfates, etc., have indicated that best results were obtainable when alkaline substances were employed as catalysts.

I have now discovered a novel process in which alkyl ethers of phenols prepared by alkylation of phenols with trialkyl phosphates may be obtained in far greater yields than were reported by Noller et al. I have found that yields of up to 70% and greater may be obtained if the reaction is carried out in the presence of acid catalysts. This is a surprising discovery in view of the prior art from which it might ordinarily be expected (a) that a basic catalyst should be employed to obtain best results, and (b) that trialkyl phosphates could not result in yields at all approaching the order of those obtained by means of the present improvement. While Noller and Dutton state that they did not in fact attempt to achieve the most efficient yields and it thus might be expected that the use of an effective catalyst would give yields of 30% or possibly 40% or more, one would not ordinarily expect to obtain conversions which are more than three times as great as those previously reported. The process of the invention provides these unusual yields regardless of whether the alkylating agent is employed in large excess or merely in a theoretically equivalent amount.

It is an object of the present invention therefore to provide a new process for the efficient preparation of alkyl ethers of phenols. Another object of the invention is to provide a suitable catalyst for the production of alkyl ethers of phenols from phenols and trialkylphosphates. Still another object is to provide for increasing the speed of reaction between trialkyl phosphates and phenols. A further object of the invention is to provide an improved procedure for the preparation of mono and poly alkyl ethers employing phosphates as the alkylating agents. Other objects include provision of improved procedures for the preparation of phenetole and diethylether of hydroquinone. A still further object is to provide acid catalysts especially adapted for the alkylation of phenols with trialkyl phosphates. Other objects will be obvious from the accompanying specification and claims.

According to the present invention there is provided a process for the preparation of alkyl ethers of phenols which comprises heating a phenol with a trialkyl phosphate in the presence of an acid catalyst, most advantageously an acid catalyst selected from the group consisting of boron trifluoride, p-toluene sulfonic acid, boric acid and boron trifluoride-etherate. The reaction may be represented by the following equation in which R represents an alkyl group, X represents —H or —OH, and Y represents —H (if X is —H) or —OR (if X is —OH):

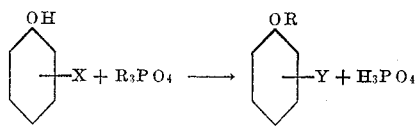

In accordance with the invention the phenol and phosphate are brought together in a reaction vessel and heated to reaction temperature for the period of time necessary to produce the desired results, the catalyst being added prior to reaction or during the course of the heating. The product may be recovered from the reaction mixture by conventional procedures appropriate to the particular product and reaction mass involved, e. g., by distillation during or after completion of the reaction, by decantation, by extraction, etc.

The process is useful with monohydroxy and polyhydroxy, aromatic compounds of both monocyclic and polycyclic structure. Accordingly, the terms "phenols" and "a phenol" as used herein are intended to be generic to the described hydroxy aromatic compounds in which the hydroxyl groups are linked to a carbon atom which is a member of an aromatic ring. Among the monohydroxy phenols to which the invention is applicable are included, for example, phenol itself, alkylated phenols, β-naphthol, etc. Among the polyhydroxy benzenes, the invention is most advantageous for use with the dihydroxy phenols such as hydroquinone, resorcinol, catechol, and hydroxy anthraquinones. The invention in one of its preferred embodiments relates to the preparation of the diethyl ether of hydroquinone. In another preferred form it relates to the production of phenetole.

As trialkyl phosphate alkylating agents, lower alkyl phosphates are most advantageous, and normal lower alkyl phosphates are preferred. By "normal lower" alkyl phosphates are meant those phosphates having alkyl radicals of straight chain conformation containing seven carbon atoms or less. Among the normal lower trialkyl phosphates which are particularly useful in the invention are the trimethyl, triethyl, tri-n-propyl, tri-n-butyl and tri-n-amyl phosphates.

As indicated above, the phosphate may be used in the amount of one equivalent for each mole of phenol. It will be noted that all three alkyl groups of the phosphate are available for alkylation purposes. It may be added that ordinarily the first alkyl group seems to be much more readily reactive than the second and third. In any event the ratio of reactants in terms of moles of phenol to moles of trialkylphosphate normally will be within the range of 1.5 to 0.5 for the production of ethers of mono-hydroxy phenols. For the production of dialkyl ethers, best results ordinarily require the use of a relatively large excess of phosphate, for example from 2½–3 times the amount of phosphate as should be required theoretically.

The time required for completion of the reaction as a practical matter may vary considerably, for example from 1 to 17 hours or more depending upon the particular reactants, proportions of reactants, etc. This is further illustrated in the examples given below.

The catalysts of the invention are acidic compounds, and the most advantageous catalysts are those enumerated above. I have found boron trifluoride to be particularly well suited in cases where a dihydroxy benzene is to be etherified. The boron trifluoride is advantageously used in the form of its coordination compound with diethyl ether, and this compound will hereinafter be referred to as boron trifluoride etherate (see "Organic Reactions" by Adams et al., vol. III, page 6, 1946).

The amount of catalyst to be employed is of course subject to variation but as will be noted from the examples below generally is within the range of about 1 to about 6 grams where the phenol is employed in an amount ranging from about 0.5 to about 1.6 moles.

The reaction most preferably is carried out at a temperature in the range of about 150° C. to about 190° C.

The range of products which may be produced by the process of the invention will be noted from the foregoing disclosure. Those products which are most suitably prepared by the novel process include, among the mono alkyl ethers, phenetole, anisole, the propyl ether of phenol, ethyl ether of β-naphthol and the monoethyl ether of hydroquinone. Among the dialkyl ether products, which generally are more difficut of preparation, are the diethyl ethers of hydroquinone, resorcinol and catechol. The invention is illustrated in the following examples which are to be considered as representative rather than limiting.

*Example 1.—Alkylation of phenol with triethylphosphate*

One hundred and forty-one grams of phenol (1.5 moles) and 91 grams of triethylphosphate (0.5 mole) were heated at 175–80° C. The reaction was proceeding very slowly. Five grams of p-toluene-sulfonic acid was added and the reaction began to proceed very rapidly. The phenetole formed was distilled out of the reaction mixture through a short column as it was formed. The product collected (165 grams) was extracted with dilute alkali and the alkaline insoluble portion was redistilled; B. P. 167–167.5° C., yield 132 g. (72 per cent). A considerable amount of the phenol was recovered.

*Example 2.—Alkylation of phenol with trimethylphosphate*

Seventy-one grams of phenol (0.75 mole), 40 grams of trimethylphosphate (0.286 mole), and 0.5 gram of p-toluene sulfonic acid were heated together. The reaction was proceeeding slowly so 1.0 gram more p-toluene sulfonic acid was added and the reaction proceeded rapidly. The anisole was distilled out of the reaction mixture through a short column; B. P. 155–158° C., yield 75 g. (92 per cent).

*Example 3.—Alkylation of phenol with tripropylphosphate*

Eighty grams (0.85 mole) of phenol, 65 g. (0.29 mole) of tripropylphosphate, and 2 grams of p-toluenesulfonic acid were heated for one hour under reflux at 150–160° C. The refluxing at this temperature soon stopped and two layers had formed. The two layers were the product and phosphoric acid. A good yield of the propyl ether of phenol was obtained by working up the product.

*Example 4.—Alkylation of β-naphthol with triethylphosphate*

Eighty-six and four tenths grams of β-naphthol (0.6 mole), 40 g. of triethylphosphate (0.22 mole), and 2 g. of p-toluene sulfonic acid were heated at 180° C. for 6 hours. The mixture was cooled, poured into water and extracted with dilute sodium hydroxide. The nonaqueous layer was taken up in benzene, washed, and distilled. The ethyl ether of β-naphthol distilled at 100–102° C. (0.8 mm.) in a yield of 70 grams (70 per cent).

*Example 5.—Alkylation of hydroquinone with triethylphosphate*

Hydroquinone was reacted with triethylphosphate at a temperature of about 170–180° C. for various time intervals, in the absence and presence of various catalysts. In all cases 1 mole of hydroquinone was used and the amount of triethylphosphate varied. The yields of hydroquinone diethyl ether produced are shown in the following table. In all cases a considerable amount of the monoethyl ether was produced but it was not usually determined, since the primary project was to produce the diether.

*Per cent yield of hydroquinone diethyl ether*

| Catalyst Used | Time in Hours | Mols TEP per Mol of HQ | Percent Yield |
| --- | --- | --- | --- |
| None | 4 | 1.66 | trace |
| Do | 15 | 1.66 | 17.5 |
| p-Toluene sulfonic acid (3 g.) | 4 | 1.0 | 30.0 |
| Do | 4 | 1.66 | 21.0 |
| Boric acid (3 g.) | 4 | 1.66 | 40.0 |
| Do | 15 | 1.66 | 32.0 |
| BF$_3$-etherate (4 cc.) | 15 | 0.74 | 44.5 |
| Do | 4 | 1.66 | 50.0 |
| Do | 15 | 1.66 | 82.0 |
| Do | 15 | 2.0 | 90.0 |

These results clearly show that of the catalysts tested, boron trifluoride was the best. They also show that, when boron trifluoride is used, the use of an excess of the trialkyl phosphate is important.

I claim:

1. A process of preparing an alkyl ether of a phenol which comprises heating the phenol with a trialkylphosphate in the presence of a catalyst selected from the group of acidic materials consisting of boric acid, boron trifluoride, boron trifluoride-etherate, and p-toluene sulfonic acid.

2. A process as defined in claim 1 wherein the phenol is a monohydroxy benzene.

3. A process as defined in claim 1 wherein the phenol is a dihydroxy benzene and the catalyst is boron trifluoride etherate.

4. A process as defined in claim 1 for the preparation of a normal lower alkyl ether of a phenol which comprises heating the phenol with a lower tri-n-alkylphosphate.

5. Process as defined in claim 4 wherein the catalyst is boron trifluoride.

6. A process of preparing the diethyl ether of hydroquinone which comprises heating hydroquinone at 170°–190° C. for from 4 to 15 hours with from 2½ to 3 times the theoretical amount of triethyl phosphate in the presence of boron trifluoride-etherate as a catalyst.

7. A process for the preparation of phenetole comprising the step of reacting phenol at a temperature of about 175–180° C. with triethylphosphate in the presence of p-toluene sulfonic acid.

8. A process for the preparation of the monopropyl ether of phenol comprising the step of reacting phenol with tripropyl phosphate in the presence of p-toluene sulfonic acid at a temperature of 150–160° C.

References Cited in the file of this patent

UNITED STATES PATENTS

| Number | Name | Date |
|---|---|---|
| 2,147,256 | Ipatieff et al. | Feb. 14, 1939 |
| 2,445,735 | Kitchen | July 20, 1948 |
| 2,470,902 | Rosenwald | May 24, 1949 |